United States Patent
Rothman et al.

(10) Patent No.: US 11,117,141 B2
(45) Date of Patent: *Sep. 14, 2021

(54) MINERAL SEPARATION USING SIZED-, WEIGHT- OR MAGNETIC-BASED POLYMER BUBBLES OR BEADS

(71) Applicant: CiDRA Corporate Services Inc., Wallingford, CT (US)

(72) Inventors: Paul J. Rothman, Windsor, CT (US); Mark R. Fernald, Enfield, CT (US); Francis K. Didden, Wallingford, CT (US); Christian V. O'Keefe, Durham, CT (US); Alan D. Kersey, South Glastonbury, CT (US); Douglas H. Adamson, Mansfield Center, CT (US)

(73) Assignee: CIDRA CORPORATE SERVICES INC., Wallingford, CT (US)

( * ) Notice: Subject to any disclaimer, the term of this patent is extended or adjusted under 35 U.S.C. 154(b) by 599 days.

This patent is subject to a terminal disclaimer.

(21) Appl. No.: 15/794,327

(22) Filed: Oct. 26, 2017

(65) Prior Publication Data

US 2018/0200730 A1    Jul. 19, 2018

Related U.S. Application Data

(62) Division of application No. 14/117,534, filed as application No. PCT/US2012/039540 on May 25, 2012, now Pat. No. 9,827,574.

(Continued)

(51) Int. Cl.
    *B03D 1/14*      (2006.01)
    *B03D 1/02*      (2006.01)
(Continued)

(52) U.S. Cl.
CPC ............... *B03C 5/00* (2013.01); *B01D 15/02* (2013.01); *B01D 37/02* (2013.01); *B01D 39/00* (2013.01);
(Continued)

(58) Field of Classification Search
CPC .......... B03D 1/023; B03D 1/14; B03D 1/016; B03C 5/00; B03C 5/02; B03C 1/01;
(Continued)

(56) References Cited

U.S. PATENT DOCUMENTS 2,585,473 A    2/1952   Kennedy
2,588,976 A    3/1952   Fuhrmeister, Jr.
(Continued)

FOREIGN PATENT DOCUMENTS

CN      101778957      7/2010
DE      3030956 A1 *    3/1982
(Continued)

OTHER PUBLICATIONS

"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.
(Continued)

*Primary Examiner* — Thomas M Lithgow
(74) *Attorney, Agent, or Firm* — Ware, Fressola, Maguire & Barber LLP

(57) ABSTRACT

Apparatus for use in, or forming part of, a separation process to be implemented in separation processor technology, the apparatus comprising synthetic bubbles or beads configured with a polymer or polymer-based material functionalized to attach to a valuable material in a mixture so as to form an enriched synthetic bubbles or beads having the valuable material attached thereto, and also configured to be sepa-
(Continued)

rated from the mixture based at least partly on a difference in a physical property between the enriched synthetic bubbles or beads having the valuable material attached thereto and the mixture.

29 Claims, 10 Drawing Sheets

Related U.S. Application Data

(60) Provisional application No. 61/489,893, filed on May 25, 2011, provisional application No. 61/533,544, filed on Sep. 12, 2011.

(51) Int. Cl.

| | | |
|---|---|---|
| C02F 1/24 | (2006.01) | |
| B03C 5/00 | (2006.01) | |
| B04C 1/00 | (2006.01) | |
| B07B 1/00 | (2006.01) | |
| B03B 1/04 | (2006.01) | |
| B03C 1/01 | (2006.01) | |
| B01D 37/02 | (2006.01) | |
| B01D 39/00 | (2006.01) | |
| C22B 15/00 | (2006.01) | |
| B01D 15/02 | (2006.01) | |
| B03D 1/016 | (2006.01) | |
| B03C 5/02 | (2006.01) | |

(52) U.S. Cl.
CPC .................. *B03B 1/04* (2013.01); *B03C 1/01* (2013.01); *B03C 5/02* (2013.01); *B03D 1/016* (2013.01); *B03D 1/023* (2013.01); *B03D 1/14* (2013.01); *B04C 1/00* (2013.01); *B07B 1/00* (2013.01); *C02F 1/24* (2013.01); *C22B 15/0063* (2013.01); *Y10T 428/2982* (2015.01)

(58) Field of Classification Search
CPC .... B04C 1/00; B07B 1/00; B03B 1/04; B01D 39/00; B01D 15/02; B01D 37/02; C22B 15/0063; Y10T 428/2982
USPC ................ 209/166–170, 4, 5, 9, 47, 49, 232
See application file for complete search history.

(56) References Cited

U.S. PATENT DOCUMENTS

| | | | |
|---|---|---|---|
| 2,699,872 | A | 1/1955 | Kelsey |
| 2,934,208 | A | 4/1960 | Schoeld et al. |
| 3,224,582 | A | 12/1965 | Iannicelli |
| 3,796,308 | A | 3/1974 | McIlhinney et al. |
| 4,100,242 | A | 7/1978 | Leach |
| 4,177,253 | A | 12/1979 | Davies et al. |
| RE30,360 | E | 8/1980 | Shubert |
| 4,224,138 | A | 9/1980 | Kruyer |
| 4,235,562 | A | 11/1980 | Ribas |
| 4,236,995 | A | 12/1980 | Kruyer |
| 4,269,699 | A | 5/1981 | McCready et al. |
| 4,313,832 | A | 2/1982 | Shimizu et al. |
| 4,358,368 | A | 11/1982 | Hellsten et al. |
| 4,363,749 | A | 12/1982 | Weiss et al. |
| 4,412,843 | A | 11/1983 | Burgess et al. |
| 4,511,461 | A | 4/1985 | Kruyer |
| 4,532,032 | A | 7/1985 | Ng et al. |
| 4,556,482 | A | 12/1985 | Nagaraj |
| 4,657,666 | A | 4/1987 | Snook et al. |
| 4,685,963 | A | 8/1987 | Saville |
| 4,888,106 | A | 12/1989 | Lipp et al. |
| 4,956,077 | A | 9/1990 | Barwise |
| 4,971,685 | A | 11/1990 | Stanley et al. |
| 4,981,582 | A | 1/1991 | Yoon et al. |
| 5,161,694 | A | 11/1992 | Yoon et al. |
| 5,192,423 | A | 3/1993 | Duczmal et al. |
| 5,603,841 | A | 2/1997 | Kerr |
| 5,670,056 | A | 9/1997 | Yoon et al. |
| 5,965,117 | A | 10/1999 | Howard, Jr. et al. |
| 6,234,318 | B1 | 5/2001 | Breau et al. |
| 6,312,603 | B1 | 11/2001 | Nishizawa |
| 6,319,407 | B1 | 11/2001 | Maatta et al. |
| 6,799,682 | B1 | 10/2004 | Yoon |
| 6,871,743 | B2 | 3/2005 | Yoon |
| 6,890,431 | B1 * | 5/2005 | Eades ........................ C02F 1/24 |
| | | | 210/195.1 |
| 7,264,728 | B2 | 9/2007 | Gibson et al. |
| 7,641,863 | B2 | 1/2010 | Doktycz et al. |
| 7,686,960 | B2 | 3/2010 | Cort |
| 7,891,213 | B2 | 2/2011 | Bogdahn et al. |
| 8,007,754 | B2 | 8/2011 | Yoon et al. |
| 9,352,335 | B2 * | 5/2016 | Rothman .................. B04C 1/00 |
| 9,943,860 | B2 * | 4/2018 | Rothman ............... B01D 39/00 |
| 9,981,272 | B2 * | 5/2018 | Rothman ............... B01D 39/00 |
| 10,357,782 | B2 * | 7/2019 | Rothman .................. B03B 1/04 |
| 10,427,166 | B2 * | 10/2019 | Didden .................. B82Y 30/00 |
| 10,751,693 | B2 * | 8/2020 | Rothman ............... C02F 1/288 |
| 10,774,400 | B2 * | 9/2020 | Rothman .................. C22B 3/24 |
| 2001/0008617 | A1 | 7/2001 | Robles |
| 2003/0104359 | A1 | 6/2003 | Cuthbertson et al. |
| 2003/0225231 | A1 | 12/2003 | Hall |
| 2004/0000523 | A1 | 1/2004 | Rosenberg et al. |
| 2004/0173506 | A1 | 9/2004 | Doktycz et al. |
| 2005/0029204 | A1 | 2/2005 | Schwartzkopf |
| 2005/0051465 | A1 | 3/2005 | Khan et al. |
| 2005/0139551 | A1 | 6/2005 | Yoon |
| 2005/0155415 | A1 | 7/2005 | Kurkowski et al. |
| 2005/0242000 | A1 | 11/2005 | Khan et al. |
| 2006/0113259 | A1 | 6/2006 | Brunone |
| 2006/0151397 | A1 | 7/2006 | Wright et al. |
| 2006/0226051 | A1 | 10/2006 | Navarrette et al. |
| 2006/0263516 | A1 | 11/2006 | Jones et al. |
| 2008/0139399 | A1 | 6/2008 | Fonnum et al. |
| 2009/0061226 | A1 | 3/2009 | Banin et al. |
| 2009/0139906 | A1 | 6/2009 | Kruyer |
| 2009/0173668 | A1 | 7/2009 | Duyvesteyn et al. |
| 2009/0206040 | A1 | 8/2009 | Berg et al. |
| 2009/0267275 | A1 | 10/2009 | Birken |
| 2009/0301972 | A1 | 12/2009 | Hines et al. |
| 2010/0059449 | A1 | 3/2010 | Grass et al. |
| 2010/0072110 | A1 | 3/2010 | Gradek |
| 2010/0108573 | A1 | 5/2010 | Ravishankar et al. |
| 2010/0200510 | A1 | 8/2010 | Domke et al. |
| 2010/0228056 | A1 | 9/2010 | Wang et al. |
| 2010/0279322 | A1 | 11/2010 | Tang et al. |
| 2010/0294725 | A1 | 11/2010 | Bush et al. |
| 2010/0300941 | A1 | 12/2010 | Domke et al. |
| 2011/0114566 | A1 | 5/2011 | McCaw et al. |
| 2012/0029120 | A1 | 2/2012 | Soane et al. |
| 2012/0076694 | A1 | 3/2012 | Morozov et al. |
| 2012/0091000 | A1 | 4/2012 | Taylor et al. |

FOREIGN PATENT DOCUMENTS

| | | |
|---|---|---|
| EP | 0164237 | 12/1980 |
| EP | 0348620 | 1/1990 |
| EP | 1184064 | 3/2002 |
| WO | 8404701 | 12/1984 |
| WO | 9211091 | 7/1992 |
| WO | 02066168 | 8/2002 |
| WO | 2004064997 | 8/2004 |
| WO | 2005066631 | 7/2005 |
| WO | 2007098115 | 8/2007 |
| WO | 2009030669 | 3/2009 |
| WO | 2010007157 | 1/2010 |
| WO | 2012028701 | 3/2012 |

OTHER PUBLICATIONS

CN101778957 English Language Abstract (1 page).
Wyss et al. "A novel approach for the extraction of herbicides and pesicides from water using liquid-core microcapsules" by Wyss et

(56) References Cited

OTHER PUBLICATIONS al. Biotechnology and Engineering; Aug. 19, 2004; abstract, 3 pages.
Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.
Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/Brown_magnetic_detergent_2012.pdf>. entire document.
EP0562040 unavailable, also published as WO9211091, cited herein.

\* cited by examiner

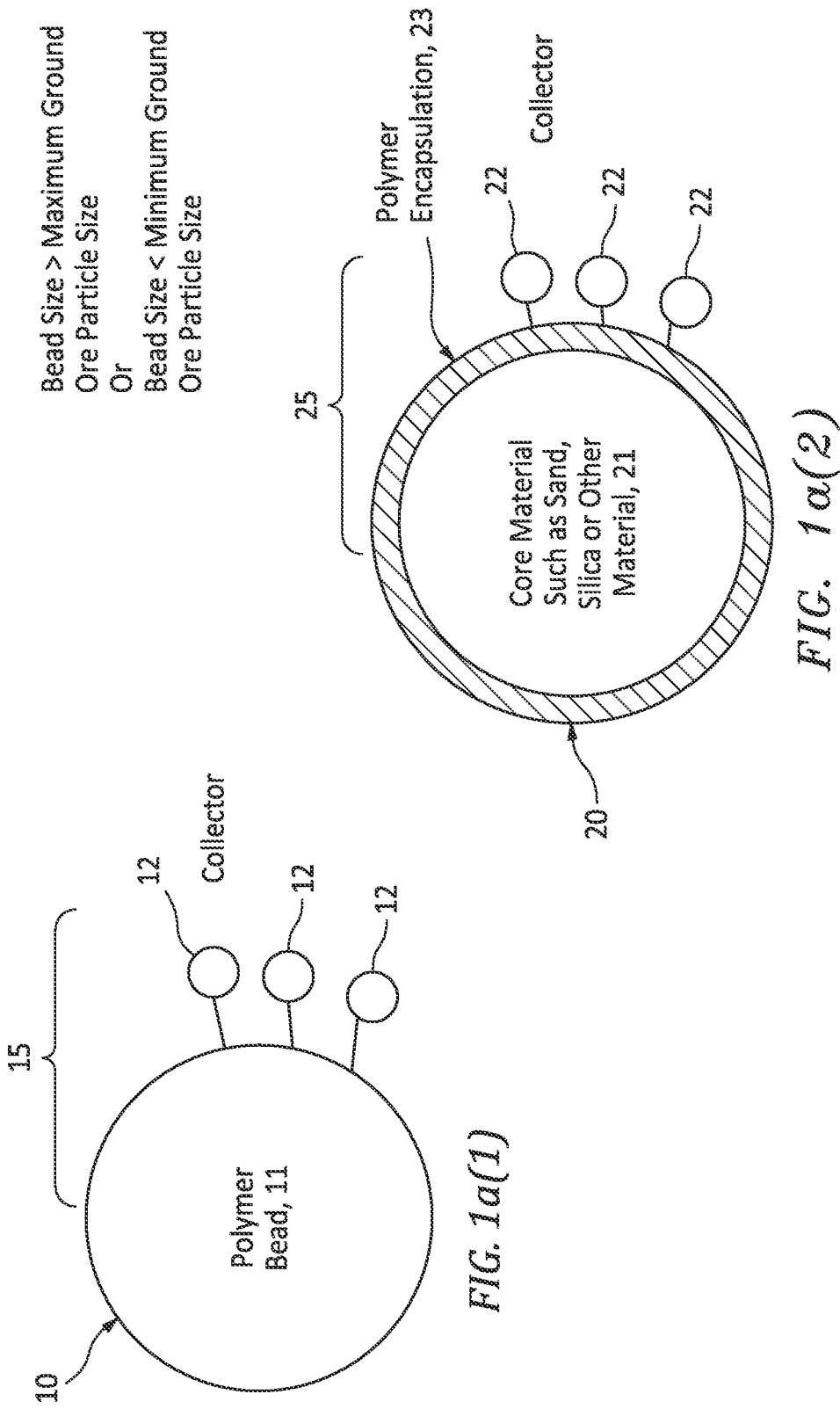
FIG. 1a: Sized-Based Beads And Bubbles

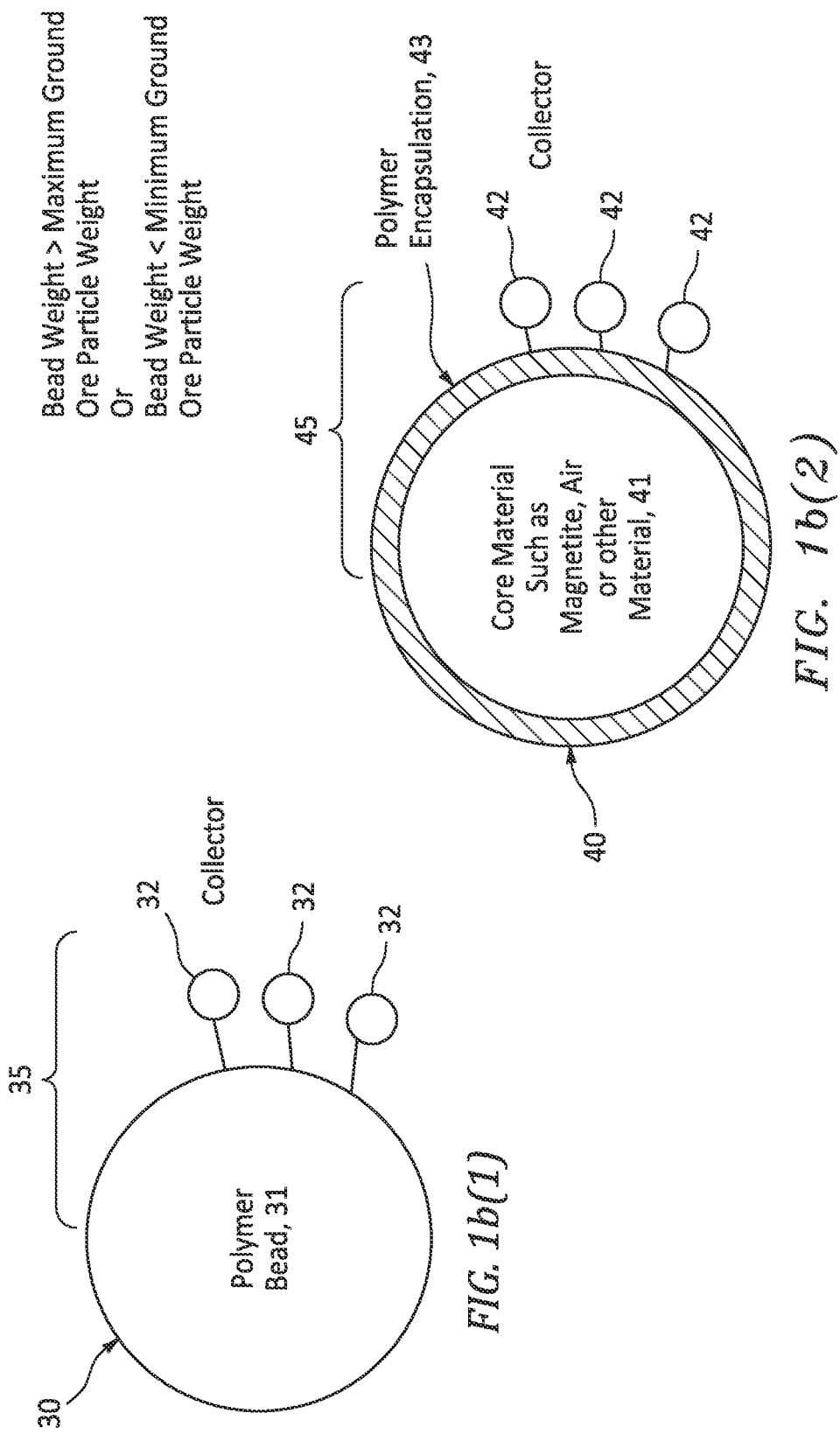
FIG. 1b: Weight-Based Beads And Bubbles

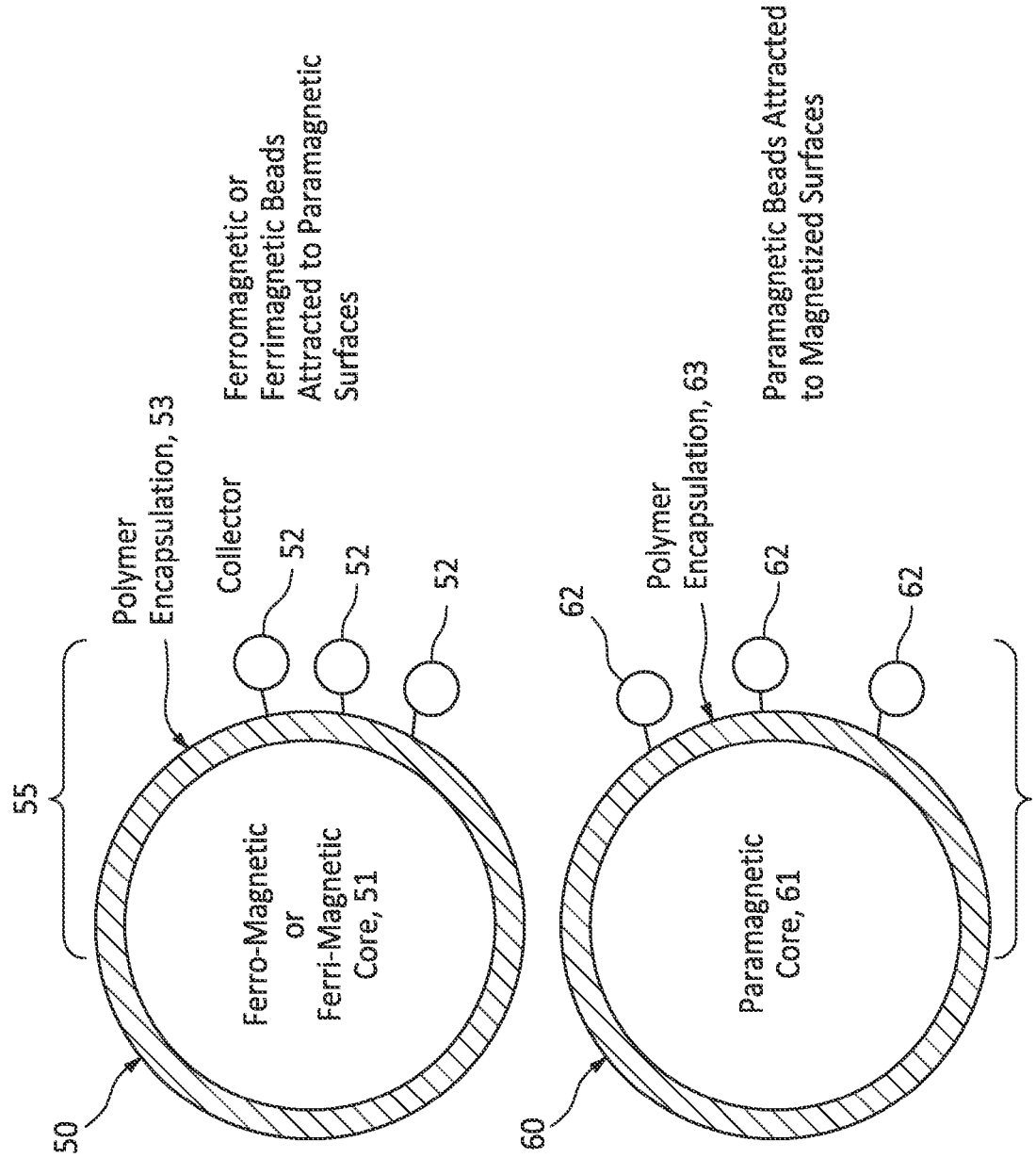

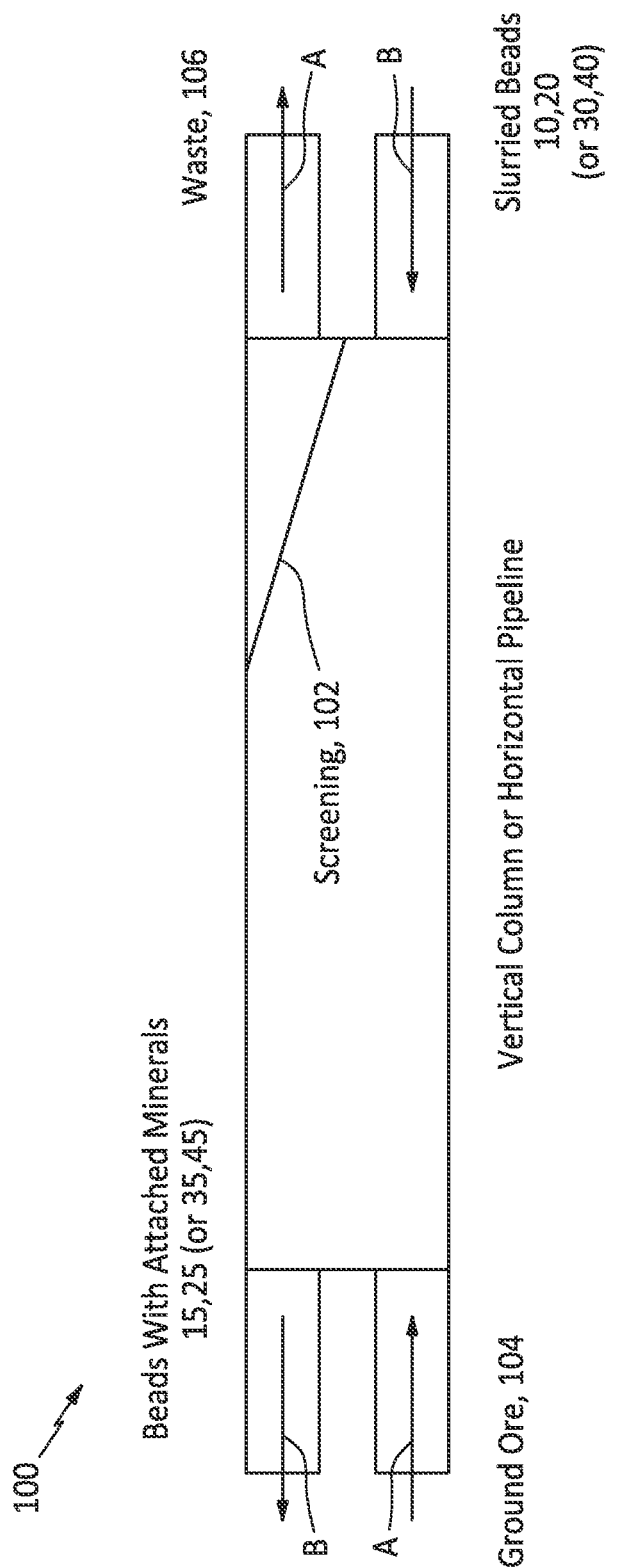
FIG. 2: Separation of Sized-Based Beads and Bubbles Using Countercurrent Flows with Mixing

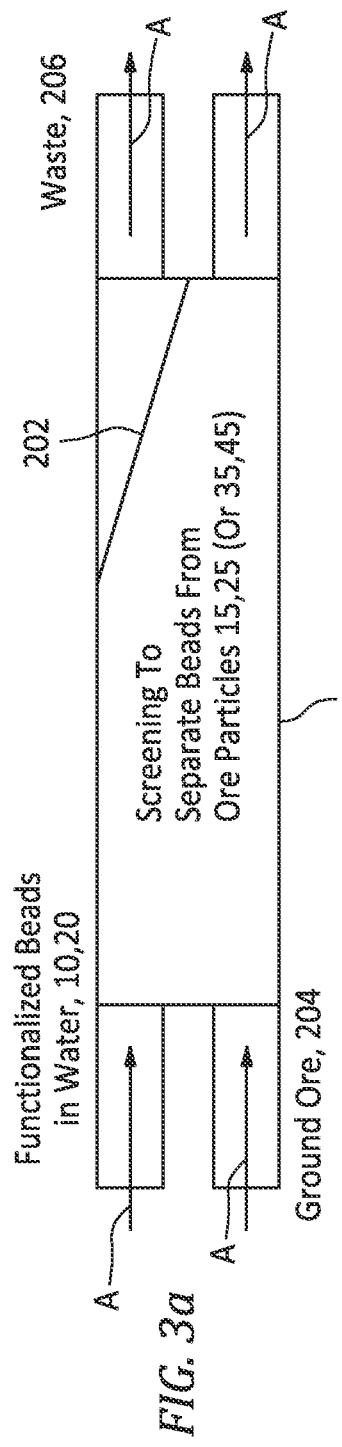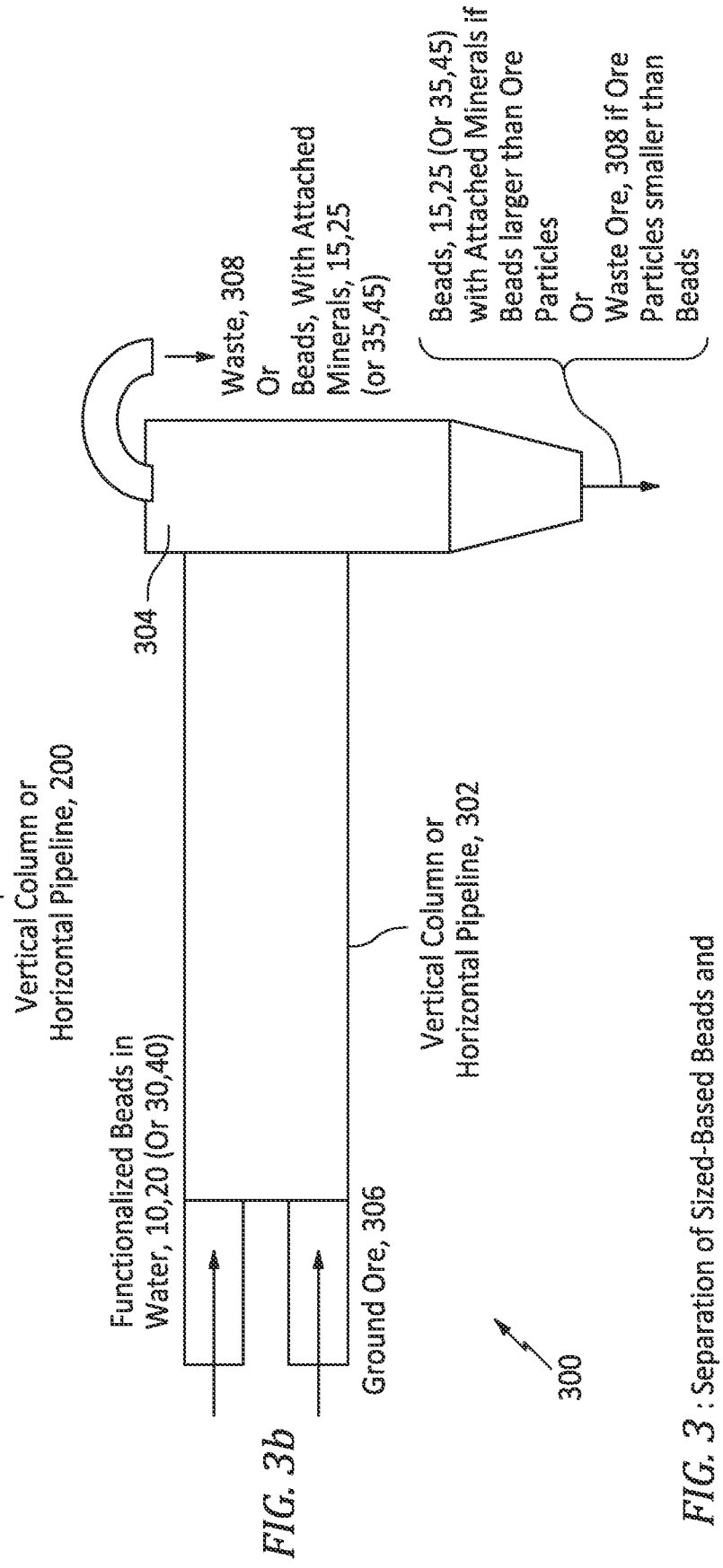
FIG. 3: Separation of Sized-Based Beads and Bubbles Using Concurrent Flows with Mixing

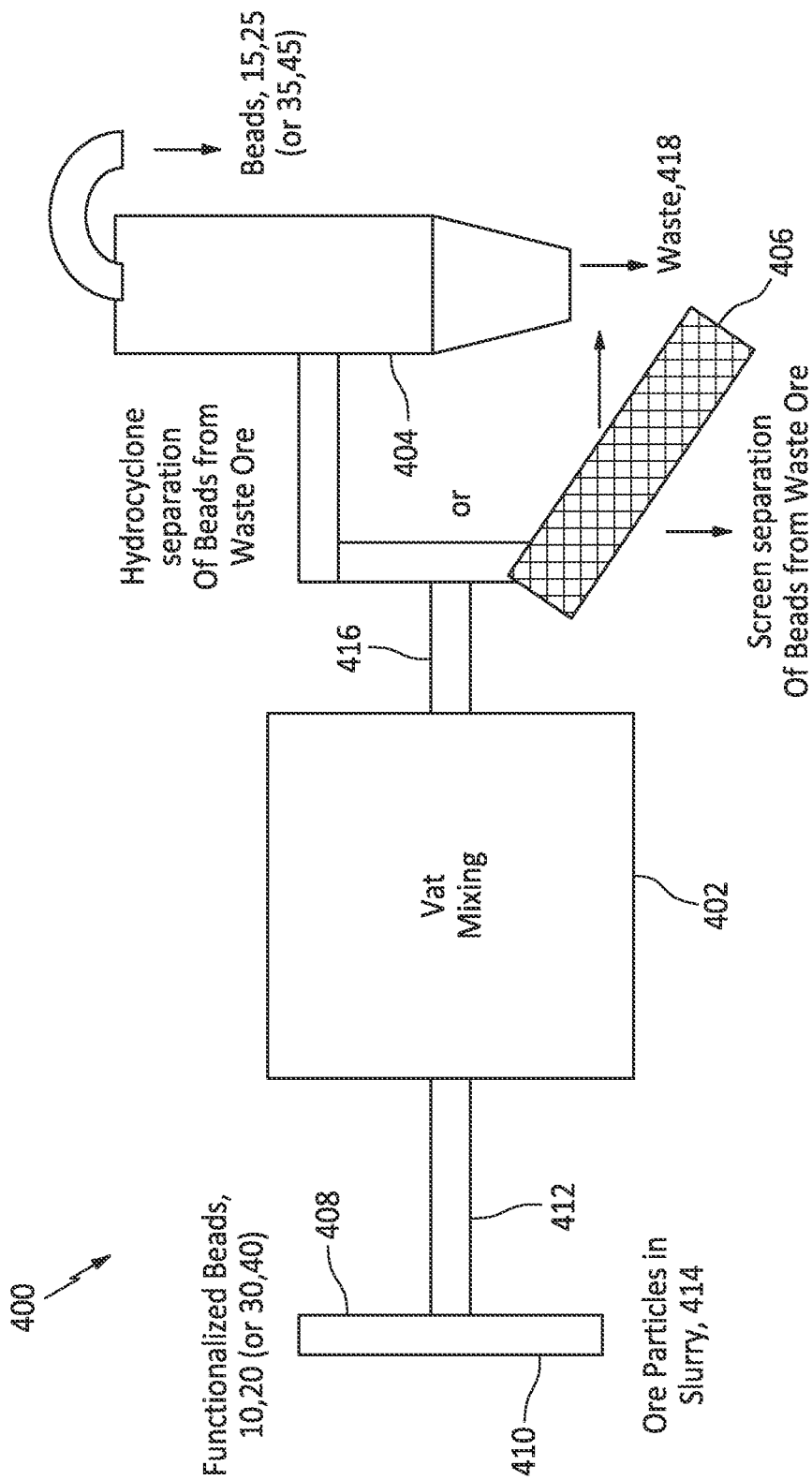
FIG. 4: Separation of Sized-Based Beads and Bubbles Using Vat Mixing and Hydrocyclone or Screening

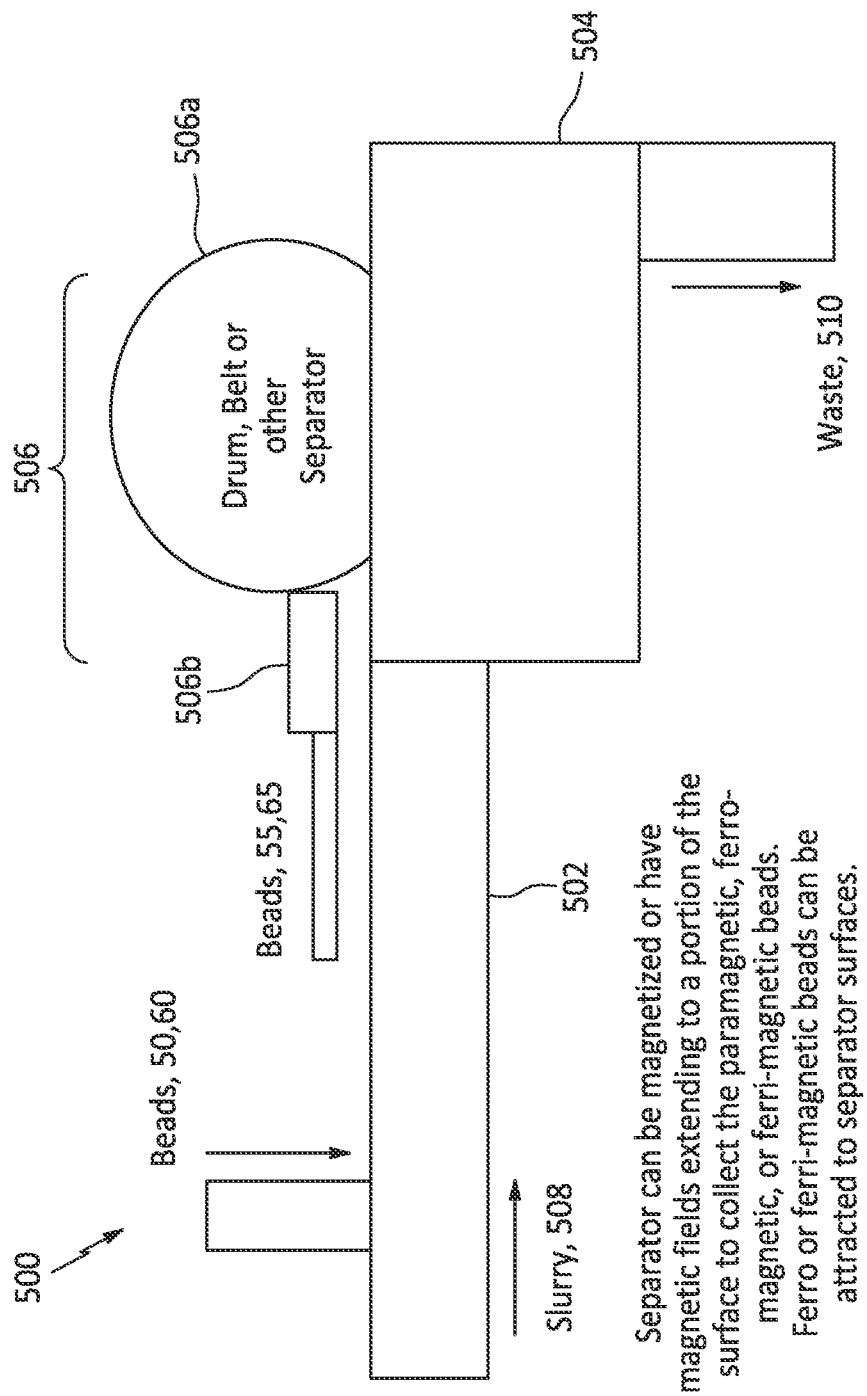
FIG. 5: Separation of Ferro-, Ferri-, Para-Based Beads and Bubbles Using Drum, Belt or Other Separator

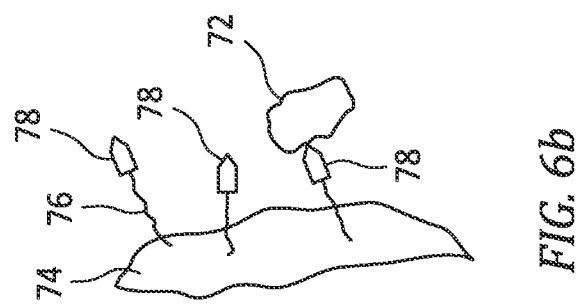
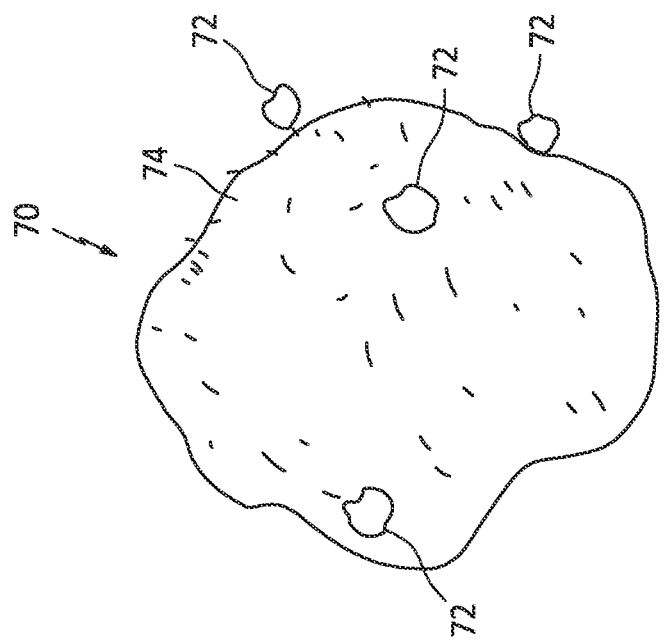

MINERAL SEPARATION USING SIZED-, WEIGHT- OR MAGNETIC-BASED POLYMER BUBBLES OR BEADS

CROSS-REFERENCE TO RELATED PATENT APPLICATIONS

This application is a divisional application, which claims benefit to patent application Ser. No. 14/117,534, filed 11 Mar. 2014, which corresponds to international patent application serial no. PCT/US2012/039540, filed 25 May 2012, which claims benefit to Provisional Patent Application No. 61/489,893, filed 25 May 2011, and U.S. Provisional Patent Application No. 61/533,544, filed 12 Sep. 2012, which are all incorporated by reference in their entirety.

This application is also related to the following eight PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39576, entitled "Synthetic bubbles/beads functionalized with molecules for attracting or attaching to mineral particles of interest;"

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides new and unique mineral separation techniques using size-, weight- or magnetic-based polymer bubbles or beads.

According to some embodiments, the present invention may take the form of apparatus for use in, or forming part of, a separation process to be implemented in separation processor technology, where the apparatus features synthetic bubbles or beads configured with a polymer or polymer-based material functionalized to attach to a valuable material in a mixture so as to form an enriched synthetic bubbles or beads having the valuable material attached thereto, and also configured to be separated from the mixture based at least partly on a difference in a physical property between the enriched synthetic bubbles or beads having the valuable material attached thereto and the mixture.

According to some embodiments of the present invention, the separation process may be implemented in separation processor technology disclosed herein which combines the synthetic bubbles or beads and the mixture, and then which provides the enriched synthetic bubbles or beads having the valuable material attached thereto that are separated from the mixture based at least partly on the difference in the physical property between the enriched synthetic bubbles or beads having the valuable material attached thereto and the mixture.

Size-Based Separation

According to some embodiments, the present invention may be implemented using sized-based separation, where the synthetic bubbles or beads may be configured to be separated from the mixture based at least partly on the difference between the size of the enriched synthetic bubbles or beads having the valuable material attached thereto in relation to the size of unwanted material in the mixture.

According to some embodiments of the present invention, the synthetic bubbles or beads may be configured either so that the size of the synthetic bubbles or beads is greater than a maximum ground ore particle size in the mixture, or so that the size of the synthetic bubbles or beads is less than a minimum ground ore particle size in the mixture.

According to some embodiments of the present invention, the synthetic bubbles or beads may be configured as solid polymer bubbles or beads.

According to some embodiments of the present invention, the synthetic bubbles or beads may be configured with a core material of sand, silica or other suitable material and also configured with a polymer encapsulation.

According to some embodiments, the present invention may take the form of apparatus for implementing the separation process using the synthetic bubbles or beads, where the apparatus may comprise a vertical column or horizontal pipeline configured with a screen to separate the enriched synthetic bubbles or beads having the valuable material attached thereto from the mixture based at least partly on the difference in size.

According to some embodiments of the present invention, the vertical column or horizontal pipeline may also be configured to separate the enriched synthetic bubbles or beads having the valuable material attached thereto from the mixture using countercurrent flows with mixing, so as to receive in the vertical column or horizontal pipeline ground ore flowing in a first direction, receive in the vertical column or horizontal pipeline slurried synthetic bubbles or beads flowing in a second direction opposite to the first direction, provide from the vertical column or horizontal pipeline the enriched synthetic bubbles or beads having the valuable material attached thereto and flowing in the second direction, and provide from the vertical column or horizontal pipeline waste that is separated from the mixture using the screen and flowing in the second direction.

According to some embodiments of the present invention, the vertical column or horizontal pipeline may also be configured to separate the enriched synthetic bubbles or beads having the valuable material attached thereto from the mixture using concurrent flows with mixing, so as to receive in the vertical column or horizontal pipeline the synthetic bubbles or beads in water flowing in a first direction, receive in the vertical column or horizontal pipeline ground ore flowing in the first direction, provide from the vertical column or horizontal pipeline waste that is separated from the mixture using the screen and flowing in the first direction, and also provide from the vertical column or horizontal pipeline the enriched synthetic bubbles or beads having the valuable material attached thereto and flowing in the first direction.

According to some embodiments, the present invention may take the form of apparatus for implementing the separation process using the synthetic bubbles or beads, where the apparatus may comprise a vertical column or horizontal pipeline and a hydrocyclone cyclone. The vertical column or horizontal pipeline may be configured to receive the synthetic bubbles or beads in water, receive ground ore, and provide the synthetic bubbles or beads in water and the ground ore in a process mixture. The hydrocyclone cyclone may be configured to receive the process mixture, separate from the process mixture the enriched synthetic bubbles or beads having the valuable material attached thereto and unwanted material in the form of waste ore, and provide the enriched synthetic bubbles or beads having the valuable material attached thereto and the waste ore, including using techniques for separating the waste ore in the form of ore particles that are smaller in size than the enriched synthetic bubbles or beads having the valuable material attached thereto, or for separating the enriched synthetic bubbles or beads having the valuable material attached thereto that are larger in size than the ore particles.

According to some embodiments, the present invention may take the form of apparatus for implementing the separation process using the synthetic bubbles or beads, where the apparatus may comprise a mixing vat configured to receive the synthetic bubbles or beads and ore particles in a slurry, and to provide the enriched synthetic bubbles or beads having the valuable material attached thereto and waste; and either a screen or a hydrocyclone cyclone configured to separate the enriched synthetic bubbles or beads having the valuable material attached thereto and the waste.

Weight-Based Separation

According to some embodiments, the present invention may be implemented using weight-based separation, where the synthetic bubbles or beads are configured to be separated from the mixture based at least partly on the difference between the weight of the enriched synthetic bubbles or beads having the valuable material attached thereto in relation to the weight of unwanted material in the mixture.

According to some embodiments of the present invention, the synthetic bubbles or beads may be configured so that the weight of the synthetic bubbles or beads is greater than a maximum ground ore particle weight in the mixture, or so that the weight of the synthetic bubbles or beads is less than a minimum ground ore particle weight in the mixture.

According to some embodiments of the present invention, the synthetic bubbles or beads may be configured as solid polymer bubbles or beads.

According to some embodiments of the present invention, the synthetic bubbles or beads may be configured with a core material of magnetite, air or other suitable material and also configured with a polymer encapsulation.

According to some embodiments, the present invention may take the form of apparatus for implementing the separation process using the synthetic bubbles or beads, where the apparatus may comprise a vertical column or horizontal pipeline and a hydrocyclone cyclone. The vertical column or horizontal pipeline may be configured to receive the synthetic bubbles or beads in water, receive ground ore, and provide the synthetic bubbles or beads in water and the ground ore in a process mixture. The hydrocyclone cyclone may be configured to receive the process mixture, separate from the process mixture the enriched synthetic bubbles or beads having the valuable material attached thereto and unwanted material in the form of waste ore, and provide the enriched synthetic bubbles or beads having the valuable material attached thereto or the waste ore. The hydrocyclone cyclone may be configured to separate the enriched synthetic bubbles or beads having the valuable material attached thereto and the unwanted material, e.g., using techniques based on the enriched synthetic bubbles or beads having the valuable material attached thereto being heavier than the ore particles, or based on the waste ore being lighter than the enriched synthetic bubbles or beads having the valuable material attached thereto.

According to some embodiments, the present invention may take the form of apparatus for implementing the separation process using the synthetic bubbles or beads, where the apparatus may comprise a wet or dry mixing vat configured to receive the synthetic bubbles or beads and ore particles, e.g., in a slurry, and to provide the enriched synthetic bubbles or beads having the valuable material attached thereto and waste ore; and either a screen configured to separate the enriched synthetic bubbles or beads having the valuable material attached thereto and the waste ore, including being responsive to a jig for weight-based separation; or a hydrocyclone cyclone configured to separate the enriched synthetic bubbles or beads having the valuable material attached thereto and the waste ore.

Magnetic-Based Separation

According to some embodiments, the present invention may be implemented using magnetic-based separation, where the synthetic bubbles or beads may be configured to be separated from the mixture based at least partly on the difference between the para-, ferri-, ferro-magnetism of the enriched synthetic bubbles or beads having the valuable material attached thereto in relation to the para-, ferri-, ferro-magnetism of unwanted material in the mixture.

According to some embodiments of the present invention, the synthetic bubbles or beads may be configured so that the para-, ferri-, ferro-magnetism of the synthetic bubbles or beads is greater than the para-, fert-, ferro-magnetism of the unwanted ground ore particle in the mixture.

According to some embodiments of the present invention, the synthetic bubbles or beads may be configured with a ferro-magnetic or ferri-magnetic core that attract to para-magnetic surfaces and also configured with a polymer encapsulation.

According to some embodiments of the present invention, the synthetic bubbles or beads are configured with a para-magnetic core that attract to magnetized surfaces and also configured with a polymer encapsulation.

According to some embodiments, the present invention may take the form of apparatus for implementing the separation process using the synthetic bubbles or beads, where the apparatus may comprise a column or pipeline and a drum or belt separator. The column or pipeline may be configured to receive the synthetic bubbles or beads, receive a ground ore slurry, and provide the synthetic bubbles or beads and the ground ore slurry in a process mixture. The drum or belt separator may be configured to receive the process mixture, separate the enriched synthetic bubbles or beads having the valuable material attached thereto and the unwanted material in the form of waste ore, and provide the enriched synthetic bubbles or beads having the valuable material attached thereto and the waste ore.

According to some embodiments of the present invention, the drum or belt separator may be configured to be magnetized or have magnetic fields extending to, or along a portion of, a surface of the drum or belt separator so as to form a separator surface to collect para-magnetic, ferro-magnetic or ferri-magnetic synthetic bubbles or beads attracted to the separator surface.

Density-Based Separation

According to some embodiments, the present invention may be implemented using density-based separation, where the synthetic bubbles or beads may be configured to be separated from the mixture based at least partly on the difference between the density of the enriched synthetic bubbles or beads having the valuable material attached thereto and the density of the mixture, consistent with that disclosed in patent application serial no. PCT/US12/39528 (WFVA/CiDRA file no. 712-2.356-1/CCS-0052), filed 25 May 2012, which is hereby incorporated by reference in its entirety.

The Synthetic Beads or Bubbles Chemistry

According to some embodiments of the present invention, the synthetic bead or bubble may take the form of a solid-phase body comprising a surface in combination with a plurality of molecules attached to the surface, the molecules comprising a functional group selected for attracting or attaching one or more mineral particles of interest to the molecules.

According to some embodiments of the present invention, the solid-phase body may be made of a synthetic material comprising the molecules. By way of example, the synthetic material may be selected from a group consisting of poly-amides (nylon), polyesters, polyurethanes, phenol-formaldehyde, urea-formaldehyde, melamine-formaldehyde, poly-acetal, polyethylene, polyisobutylene, polyacrylonitrile, poly(vinyl chloride), polystyrene, poly(methyl methacrylates), poly(vinyl acetate), poly(vinylidene chloride), poly-isoprene, polybutadiene, polyacrylates, poly(carbonate), phenolic resin and polydimethylsiloxane.

According to some embodiments of the present invention, the solid-phase body may include a shell providing the surface, the shell being made of a synthetic material comprising the molecules.

According to some embodiments of the present invention, the shell may comprise an interior part arranged to encapsulate a gaseous element such that the synthetic bead has a density less than the aqueous mixture.

According to some embodiments of the present invention, the shell may comprise an interior part arranged to encapsulate a liquid having a chemical property different from the aqueous mixture, in order to control the chemistry of a process being performed in relation to the aqueous mixture.

According to some embodiments of the present invention, the shell may comprise an interior part arranged to encapsulate a solid-phase material different from the synthetic material, and the solid-phase material may be selected to control the density of the synthetic bead relative to the density of the aqueous mixture.

According to some embodiments of the present invention, the shell may comprise an interior part configured to encapsulate a magnetic material.

According to some embodiments of the present invention, the solid-phase body may comprise a core and a coating over the core for providing the surface, and the coating may be made of a synthetic material and the core is made of a core material different from the synthetic material. By way of example, the core material may be selected from a group consisting of glass, ceramic, metal and a polymer that is different from the synthetic material. The term "polymer" in this specification is understood to mean a large molecule made of many units of the same or similar structure linked together.

According to some embodiments of the present invention, the functional group may have an anionic bond for attracting or attaching the mineral particles to the surface.

According to some embodiments of the present invention, the functional group may take the form of a collector having a non-ionizing bond or an ionizing bond.

According to some embodiments of the present invention, the ionizing bond may be an anionic bond or a cationic bond. The anionic bond comprises an oxyhydryl, including carboxylic, sulfates and sulfonates, and sulfhydral bond.

According to some embodiments of the present invention, the synthetic beads may be configured with a size depending on the particular application, or depending on the particular size of the mineral particle of interest. According to some embodiments of the present invention, the synthetic beads may be configured with a size less than 100 µm for attracting or attaching to the mineral particles, e.g., having a substantially similar size, including in applications related to flotation cells. Alternatively, according to some embodiments of the present invention, the synthetic beads may be configured with a size in a range of about 1 mm to 10 mm for attracting or attaching to the mineral particles, including in applications related to a tailings pond. Furthermore, according to some embodiments of the present invention, the synthetic beads may also be configured with a size of about 100 µm for attracting or attaching to the mineral particles, e.g., having a substantially similar size; or the synthetic beads may be configured with a size in a range of about 100-200 µm for attracting or attaching to the mineral particles, e.g., having a substantially similar size; or the synthetic beads may be configured with a size about 200 µm for attracting to the mineral particles, e.g., having a substantially similar size.

Hydrophobicity

According to some embodiments of the present invention, the surface of the synthetic bubbles or beads may be functionalized to be hydrophobic so as to provide a bonding between the surface and a mineral particle associated with one or more hydrophobic molecules.

Furthermore, the polymer can be naturally hydrophobic or functionalized to be hydrophobic. Therefore, the terms "polymer bubbles or beads" and "synthetic bubbles or beads" may be used interchangeably herein. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The mineral particle of interest or the valuable material associated with one or more hydrophobic molecules is referred to as a wetted mineral particle. When the pulp slurry contains a plurality of collectors or collector molecules, some of the mineral particles will become wetted mineral particles if the collectors are attached to mineral particles. Xanthates can be used in the pulp slurry as the collectors. The bubbles or beads can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and hydrophobic. The bubbles or beads can be made of hydrophobic polymers, such as polystyrene and polypropylene to provide the desired hydrophobicity.

Combined Collector/Hydrophobic Beads/Bubbles

According to some embodiments of the present invention, only a part of the surface of the functionalized polymer coated member may be configured to have the molecules attached thereto, wherein the molecules comprise collectors.

According to some embodiments of the present invention, a part of the surface of the functionalized polymer coated member may be configured to have the molecules attached thereto, wherein the molecules comprise collectors, and another part of the surface of the functionalized polymer coated member may be configured to be hydrophobic.

According to some embodiments of the present invention, a part of the surface of the functionalized polymer coated member may be configured to be hydrophobic.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIGS. 1a, 1b and 1c show respectively sized-based beads or bubbles, weight-based polymer beads or bubbles, and magnetic-based beads or bubbles according to some embodiments of the present invention, including FIGS. 1a(1) and 1a(2) that respectively show a size-based solid polymer bead or bubble and a size-based bead or bubble having a core material and a polymer encapsulation; FIGS. 1b(1) and 1b(2) that respectively show a weight-based solid polymer bead or bubble and a weight-based bead or bubble having a core material and a polymer encapsulation; and FIGS. 1c(1) and 1c(2) that respectively show a magnetic-based bead or bubble having a ferro-, or ferri-, or paramagnetic core and a polymer encapsulation.

FIG. 2 is diagram of apparatus for separation of size-based beads or bubbles using countercurrent flows with mixing according to some embodiments of the present invention.

FIG. 3, including FIGS. 3a and 3b, includes diagrams of apparatus for separation of size-based beads or bubbles using concurrent flows with mixing according to some embodiments of the present invention.

FIG. 4 is diagram of apparatus for separation of size-based beads or bubbles using vat mixing and either hydrocyclone or screen separation according to some embodiments of the present invention.

FIG. 5 is diagram of apparatus for separation of ferro-, ferri- or para-based beads or bubbles using a drum, belt or other separator according to some embodiments of the present invention.

FIG. 6a shows a generalized synthetic bead which can be a size-based bead or bubble, weight-based polymer bead and bubble, and magnetic-based bead and bubble, according to some embodiments of the present invention.

FIG. 6b illustrates an enlarged portion of the synthetic bead showing a molecule or molecular segment for attaching a function group to the surface of the synthetic bead, according to some embodiments of the present invention.

DETAILED DESCRIPTION OF THE INVENTION

FIGS. 1a, 1b, 1c

Figure 7B:
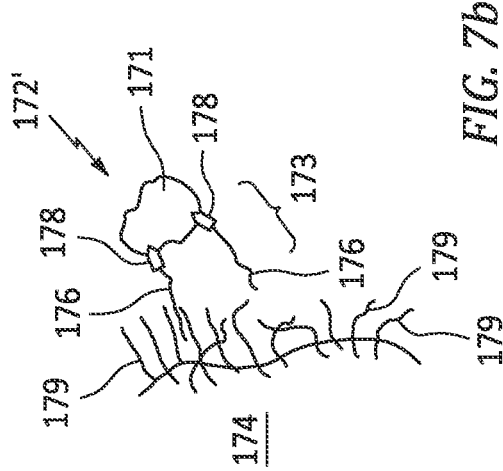
FIG. 7b illustrates an enlarged portion of the synthetic bead showing a wetted mineral particle attached to the hydrophobic surface of the synthetic bead, according to some embodiments of the present invention.

FIGS. 1a, 1b and 1c show the present invention is the form of apparatus for use in, or forming part of, a separation process to be implemented in separation processor technology, the apparatus featuring synthetic bubbles or beads indicated by arrows 10 (FIG. 1a(1)), 20 (FIG. 1a(2)), 30 (FIG. 1b(1)), 40 (FIG. 1b(2)), 50 (FIG. 1c(1)), 60 (FIG. 1c(2)), configured with a polymer or polymer-based material 11 (FIG. 1a(1)), 21 (FIG. 1a(2)), 31 (FIG. 1b(1)), 41 (FIG. 1b(2)), 51 (FIG. 1c(1)), 61 (FIG. 1c(2)) functionalized to attach to a valuable material 12 (FIG. 1a(1)), 22 (FIG. 1a(2)), 32 (FIG. 1b(1)), 42 (FIG. 1b(2)), 52 (FIG. 1c(1)), 62 (FIG. 1c(2)) in a mixture so as to form an enriched synthetic bubbles or beads generally indicated as 15 (FIG. 1a(1)), 25 (FIG. 1a(2)), 35 (FIG. 1b(1)), 45 (FIG. 1b(2)), 55 (FIG. 1c(1)), 65 (FIG. 1c(2)) having the valuable material 12 (FIG. 1a(1)), 22 (FIG. 1a(2)), 32 (FIG. 1b(1)), 42 (FIG. 1b(2)), 52 (FIG. 1c(1)), 62 (FIG. 1c(2)) attached thereto, consistent with that disclosed herein, and also configured to be separated from the mixture based at least partly on a difference in a physical property between the enriched synthetic bubbles or beads 15 (FIG. 1a(1)), 25 (FIG. 1a(2)), 35 (FIG. 1b(1)), 45 (FIG. 1b(2)), 55 (FIG. 1c(1)), 65 (FIG. 1c(2)) having the valuable material 12 (FIG. 1a(1)), 22 (FIG. 1a(2)), 32 (FIG. 1b(1)), 42 (FIG. 1b(2)), 52 (FIG. 1c(1)), 62 (FIG. 1c(2)) attached thereto and the mixture, also consistent with that disclosed herein.

In FIG. 1a(1), the synthetic bubble or bead 10 is a size-based solid polymer bead or bubble 11 functionalized to attach to the valuable material 12 of interest in the mixture and to be separated from the mixture based on size. In FIG. 1a(2), the synthetic bubble or bead 20 is a size-based bead or bubble 20 having a core material 21 and a polymer encapsulation 23 functionalized to attach to the valuable material 22 of interest in the mixture and to be separated from the mixture based on size. By way of example, the core material 21 may include materials such as sand, silica or other suitable material either now known or later developed in the future. Polymers or polymer-based materials that may be functionalized to attach to such a valuable material, such as valuable material 12 (FIG. 1a(1)), 22 (FIG. 1a(2)), 32 (FIG. 1b(1)), 42 (FIG. 1b(2)), 52 (FIG. 1c(1)), 62 (FIG. 1c(2)), of interest, such as copper gold or other mineral are known in the art, and the scope of the invention is not intended to be limited to any particular type or kind thereof. Embodiments are envisioned using polymers or polymer-based materials now known and later developed in the future.

According to the present invention, the synthetic bubbles or beads 10 or 20 in FIG. 1a may be configured to be separated from the mixture based at least partly on the difference between the size of the enriched synthetic bubbles or beads having the valuable material 12, 22 attached thereto in relation to the size of unwanted material in the mixture, consistent with that disclosed in FIGS. 2-4. For example, the synthetic bubble or bead 10 or 20 may be configured either so that the size of the synthetic bubbles or beads 10 or 20 is greater than a maximum ground ore particle size in the mixture, or so that the size of the synthetic bubbles or beads 10 or 20 is less than a minimum ground ore particle size in the mixture.

In FIG. 1b(1), the synthetic bubble or bead 30 is a weight-based solid polymer bead or bubble 31 functionalized to attach to the valuable material 32 of interest in the mixture and to be separated from the mixture based on weight. In FIG. 1b(2), the synthetic bubbles or beads 40 is a weight-based bead or bubble 40 having a core material 41 and a polymer encapsulation 43 functionalized to attach to the valuable material 42 of interest in the mixture and to be separated from the mixture based on weight. The core material 41 may be made of materials, e.g., such as magnetite, air or other suitable material and also configured with a polymer encapsulation.

According to the present invention, the synthetic bubbles or beads 30, 40 may be configured to be separated from the mixture based at least partly on the difference between the weight of the enriched synthetic bubbles or beads having the valuable material attached thereto in relation to the weight of unwanted material in the mixture. For example, the synthetic bubbles or beads 30, 40 may be configured so that the weight of the synthetic bubbles or beads is greater than a maximum ground ore particle weight in the mixture, or so that the weight of the synthetic bubbles or beads is less than a minimum ground ore particle weight in the mixture.

In FIG. 1c(1), the synthetic bead or bubble 50 is shown as a magnetic-based bead or bubble having a ferro- or ferri-magnetic core 51 and a polymer encapsulation 53, such that the ferro-magnetic or ferri-magnetic core 51 attracts to paramagnetic surfaces. In FIG. 1c(2), the synthetic bead or bubble is shown as a magnetic-based bead or bubble having a para-magnetic core 61 and a polymer encapsulation 63, such that the para-magnetic core attracts to magnetized surfaces.

According to the present invention, the synthetic bubbles or beads 50, 60 may be configured to be separated from the mixture based at least partly on the difference between the para-, ferri-, ferro-magnetism of the enriched synthetic bubbles or beads having the valuable material 52, 62 attached thereto in relation to the para-, ferri-, ferro-magnetism of unwanted material in the mixture.

FIGS. 2-4: Size-Based and Weight-Based Separation

As shown in FIG. 2, the synthetic bubbles or beads 10 (FIG. 1a(1)), 20 (FIG. 1a(2)) may be used in, or form part of, a size-based separation process using countercurrent flows with mixing implemented in apparatus such as a vertical column or horizontal pipeline generally indicated as 100, according to some embodiments of the present invention. In FIG. 2, the vertical column or horizontal pipeline 100 is configured with a screen 102 to separate the enriched synthetic bubbles or beads 15 (FIG. 1a(1)), 25 (FIG. 1a(2)) having the valuable material 12 (FIG. 1a(1)), 22 (FIG. 1a(2)) attached thereto from the mixture based at least partly on the difference in size. The vertical column or horizontal pipeline 100 may be configured to separate the enriched synthetic bubbles or beads 15 (FIG. 1a(1)), 25 (FIG. 1a(2)) having the valuable material 12 (FIG. 1a(1)), 22 (FIG. 1a(2)) attached thereto from the mixture using countercurrent flows with mixing, so as to receive in the vertical column or horizontal pipeline 100 ground ore 104 flowing in a first direction A, receive in the vertical column or horizontal pipeline 100 slurried synthetic bubbles or beads 10 (FIG. 1a(1)), 20 (FIG. 1a(2)) flowing in a second direction B opposite to the first direction A, provide from the vertical column or horizontal pipeline 100 the enriched synthetic bubbles or beads 15 (FIG. 1a(1)), 25 (FIG. 1a(2)) having the valuable material 12 (FIG. 1a(1)), 22 (FIG. 1a(2)) attached thereto and flowing in the second direction B, and also provide from the vertical column or horizontal pipeline 100 waste 106 that is separated from the mixture using the screen 102 and flowing in the second direction B.

As shown in FIG. 3a, the synthetic bubbles or beads 10 (FIG. 1a(1)), 20 (FIG. 1a(2)) may be used in, or form part of, a size-based separation process implemented in apparatus such as a vertical column or horizontal pipeline generally indicated as 200, according to some embodiments of the present invention. In FIG. 3a, the vertical column or horizontal pipeline 200 may be configured with a screen 202 to separate the enriched synthetic bubbles or beads 15 (FIG. 1a(1)), 25 (FIG. 1a(2)) having the valuable material 12 (FIG. 1a(1)), 22 (FIG. 1a(2)) attached thereto from the mixture using concurrent flows with mixing, so as to receive in the vertical column or horizontal pipeline 200 the synthetic bubbles or beads 10 (FIG. 1a(1)), 20 (FIG. 1a(2)) in water flowing in a first direction A, receive in the vertical column or horizontal pipeline 200 ground ore 204 flowing in the first direction A, provide from the vertical column or horizontal pipeline 200 waste 206 that is separated from the mixture using the screen 202 and flowing in the first direction A, and also provide from the vertical column or horizontal pipeline 200 the enriched synthetic bubbles or beads 15 (FIG. 1a(1)), 25 (FIG. 1a(2)) having the valuable material 12 (FIG. 1a(1)), 22 (FIG. 1a(2)) attached thereto and flowing in the first direction A, according to some embodiments of the present invention.

As shown in FIG. 3b, the synthetic bubbles or beads 10 (FIG. 1a(1)), 20 (FIG. 1a(2)) may be used in, or form part of, a size-based separation process implemented in apparatus generally indicated as 300 having a vertical column or horizontal pipeline 302 in combination with a hydrocyclone cyclone 304, according to some embodiments of the present invention. In FIG. 3b, the vertical column or horizontal pipeline 302 may be configured to receive the synthetic bubbles or beads 10 (FIG. 1a(1)), 20 (FIG. 1a(2)) in water, receive ground ore 306, and provide the synthetic bubbles or beads in water and the ground ore in a process mixture. The hydrocyclone cyclone 304 is configured to receive the process mixture, separate from the process mixture the enriched synthetic bubbles or beads 15 (FIG. 1a(1)), 25 (FIG. 1a(2)) having the valuable material 12 (FIG. 1a(1)), 22 (FIG. 1a(2)) attached thereto and unwanted material in the form of waste ore 308, and provide either the enriched synthetic bubbles or beads 15 (FIG. 1a(1)), 25 (FIG. 1a(2)) having the valuable material 12 (FIG. 1a(1)), 22 (FIG. 1a(2)) attached thereto or the waste ore 308, including providing the enriched synthetic bubbles or beads having the valuable material attached thereto that are heavier than ore particles, or providing the waste ore that is lighter than the enriched synthetic bubbles or beads having the valuable material attached thereto.

As shown in FIG. 4, the synthetic bubbles or beads 10 (FIG. 1a(1)), 20 (FIG. 1a(2)) may be used in, or form part of, a size-based separation process implemented in apparatus generally indicated as 400 having a mixing vat 402 in combination with a hydrocyclone cyclone 404 or a separation screen 406, according to some embodiments of the present invention. In FIG. 4, the mixing vat 402 is configured with piping 408, 410, 412 to receive the synthetic bubbles or beads 10 (FIG. 1a(1)), 20 (FIG. 1a(2)) and ore particles 414 in a slurry, and to provide via piping 416 the enriched synthetic bubbles or beads 15 (FIG. 1a(1)), 25 (FIG. 1a(2)) having the valuable material 12 (FIG. 1a(1)), 22 (FIG. 1a(2)) attached thereto and waste to the hydrocyclone 404 or screen 406 via piping 416. In one embodiment, the screen 406 may be configured to separate the enriched synthetic bubbles or beads 15 (FIG. 1a(1)), 25 (FIG. 1a(2)) having the valuable material 12 (FIG. 1a(1)), 22 (FIG. 1a(2)) attached thereto and the waste. In an alternative embodiment, the hydrocyclone cyclone 404 may be configured to separate the enriched synthetic bubbles or beads 15 (FIG. 1a(1)), 25 (FIG. 1a(2)) having the valuable material 12 (FIG. 1a(1)), 22 (FIG. 1a(2)) attached thereto and the waste.

Weight-Based Separation

By way of example, the apparatus 300 and 400 disclosed in FIGS. 3b and 4 may be adapted and configured to implement a weight-based separation process according to some embodiments of the present invention.

For example, the synthetic bubbles or beads 30 (FIG. 1b(1)), 40 (FIG. 1b(2)) may be used in, or form part of, a weight-based separation process implemented in the apparatus 300 in FIG. 3b, or the apparatus 400 in FIG. 4, according to some embodiments of the present invention.

According to some embodiments of the present invention, the apparatus 300 in FIG. 3b, including the vertical column or horizontal pipeline 302 and the hydrocyclone cyclone 304, may be suitably adapted or configured to implement a weigh-based separation technique. For instance, the vertical column or horizontal pipeline 302 may be suitably adapted or configured to receive the synthetic bubbles or beads 30 (FIG. 1b(1)), 40 (FIG. 1b(2)) in water, receive ground ore like ore 306, and provide the synthetic bubbles or beads in water and the ground ore in a process mixture. The hydrocyclone cyclone 304 may be suitably adapted or configured to receive the process mixture, separate from the process mixture the enriched synthetic bubbles or beads 35 (FIG. 1b(1)), 45 (FIG. 1b(2)) having the valuable material 32 (FIG. 1b(1)), 42 (FIG. 1b(2)) attached thereto and unwanted material in the form of waste ore, and provide the enriched synthetic bubbles or beads 35 (FIG. 1b(1)), 45 (FIG. 1b(2)) having the valuable material 32 (FIG. 1b(1)), 42 (FIG. 1b(2)) attached thereto and the waste ore.

Further, according to some embodiments of the present invention, the apparatus 400 in FIG. 4, including the wet or dry mixing vat 402 and the hydrocyclone cyclone 404 or the screen 406, may be suitably adapted or configured to implement a weigh-based separation technique. For example, the wet or dry mixing vat 402 may be suitably adapted or configured to receive the synthetic bubbles or beads 30 (FIG. 1b(1)), 40 (FIG. 1b(2)) and ore particles 414 in a slurry, and to provide the enriched synthetic bubbles or beads 35 (FIG. 1b(1)), 45 (FIG. 1b(2)) having the valuable material 32 (FIG. 1b(1)), 42 (FIG. 1b(2)) attached thereto and waste ore. The screen 406 may be suitably adapted or configured to separate the enriched synthetic bubbles or beads 35 (FIG. 1b(1)), 45 (FIG. 1b(2)) having the valuable material 32 (FIG. 1b(1)), 42 (FIG. 1b(2)) attached thereto and the waste ore 418, including being responsive to a jig for weight-based separation of the enriched synthetic bubbles or beads 35 (FIG. 1b(1)), 45 (FIG. 1b(2)) from the waste ore. Alternatively, the hydrocyclone cyclone 404 may be suitably adapted or configured to separate the enriched synthetic bubbles or beads 35 (FIG. 1b(1)), 45 (FIG. 1b(2)) having the valuable material the enriched synthetic bubbles or beads 32 (FIG. 1b(1)), 42 (FIG. 1b(2)) attached thereto and the waste ore.

FIG. 5: Magnetic-Based Separation

As shown in FIG. 5, the synthetic bubbles or beads 50 (FIG. 1c(1)), 60 (FIG. 1c(2)) may be used in, or form part of, a magnetic-based separation process implemented in apparatus generally indicated as 500, according to some embodiments of the present invention. For example, the apparatus 500 may comprise a column or pipeline 502, a vat or container 504 and a drum or belt magnetic separator or other magnetic separator 506. The drum or belt magnetic separator or other magnetic separator 506 may include a drum or belt 506a and a knife-like or edge-like device 506b. The column or pipeline 502 may be configured to receive the synthetic bubbles or beads 50 (FIG. 1c(1)), 60 (FIG. 1c(2)), receive a ground ore slurry 508, and provide the synthetic bubbles or beads 50 (FIG. 1c(1)), 60 (FIG. 1c(2)) and the ground ore slurry 502 in a process mixture to the vat or container 504. The drum or belt separator 506 may be configured to separate the enriched synthetic bubbles or beads 55 (FIG. 1c(1)), 65 (FIG. 1c(2)) having the valuable material 52 (FIG. 1c(1)), 62 (FIG. 1c(2)) attached thereto and the unwanted material 510 in the form of waste ore, and provide the enriched synthetic bubbles or beads 55 (FIG. 1c(1)), 65 (FIG. 1c(2)) having the valuable material 52 (FIG. 1c(1)), 62 (FIG. 1c(2)) attached thereto and the waste ore 510. As shown, the drum or belt magnetic separator or other magnetic separator 506 includes knife-like or edge-like device 506b for removing magnetically coupled enriched synthetic bubbles or beads 55 (FIG. 1c(1)), 65 (FIG. 1c(2)) from the drum or belt 506a.

According to some embodiments of the present invention, the drum or belt separator 506 may be configured to be magnetized or have magnetic fields extending to, or along a portion of, its surface of the drum or belt separator so as to form a separator surface to collect the para-magnetic, ferro-magnetic or ferri-magnetic synthetic bubbles or beads 55 (FIG. 1c(1)), 65 (FIG. 1c(2)) having the valuable material 52 (FIG. 1c(1)), 62 (FIG. 1c(2)) attached thereto that are attracted to the separator surface as it rotates inside the vat or container 504, as shown.

A person skilled in the art would appreciate what is meant by the terms para-, ferri-, ferro-magnetism. However, by way of example, the Wikipedia Dictionary defines these terms as follows:
Ferromagnetism is the basic mechanism by which certain materials (such as iron) form permanent magnets, or are attracted to magnets.
A ferrimagnetic material is one in which the magnetic moments of the atoms on different sublattices are opposed, as in antiferromagnetism; however, in ferri-magnetic materials, the opposing moments are unequal and a spontaneous magnetization remains.
Paramagnetism is a form of magnetism whereby the paramagnetic material is only attracted when in the presence of an externally applied magnetic field.

A Physical Property

For the purpose of describing and understanding the present invention, a physical property is understood to be any quality that is a measurable whose value describes a physical system's state, as defined by the Wikipedia Dictionary. Changes in the physical properties of a system can be used to describe its transformations (or evolutions between its momentary states). Physical properties can be intensive or extensive, where an intensive property does not depend on the size or amount of matter in the object, while an extensive property does. Physical properties are contrasted with chemical properties which determine the way a material behaves in a chemical reaction. Physical properties are properties that do not change the chemical nature of matter.

By way of example, the present invention is described in relation to physical property of the synthetic beads or bubbles that take the form of size, weight, magnetism and density. However, embodiments of the present invention are envisioned using other types or kinds of physical properties either now known or later developed in the future, including electrostatic charge, as well as other types or kinds of physical properties that would allow, or provide for, the synthetic bead having the valuable material attached thereto to be separated from the mixture based at least partly on a difference in the physical property between the enriched synthetic bubbles or beads having the valuable material attached thereto and the mixture, consistent with that set forth herein.

Implementation of the Separation Techniques

Vertical column or horizontal pipelines like element 100, hydrocyclones like element 304, vat mixing devices like element 402, screens like element 406 and drum or belt magnetic separators like element 506 for implementing separation techniques based on size, weight or magnetism are known in the art, and the scope of the invention is not intended to be limited to any particular type or kind thereof either now known or later developed in the future.

Further, a person skilled in the art would be able to implement separation techniques based on size, weight, magnetism or density without undue experimentation using vertical column or horizontal pipelines like element 100, hydrocyclones like element 304, vat mixing devices like element 402, screens like element 406 and drum or belt magnetic separators like element 506 consistent with that disclosed herein.

FIGS. 6a, 6b: The Synthetic Bead Chemistry

For aiding a person of ordinary skill in the art in understanding various embodiments of the present invention, FIG. 6a shows a generalized synthetic bead and FIG. 6b shows an enlarged portion of the surface. As shown in FIGS. 6a and 6b, the synthetic bead 70 has a bead body to provide a bead surface 74. At least the outside part of the bead body may be made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting a mineral, such as copper to the surface 74. A xanthate, for example, has both the functional group 78 and the molecular segment 76 to be incorporated into the polymer that is used to make the synthetic bead 70. The functional group 78 is also known as a collector that can have a non-ionizing or ionizing bond. The ionizing bond can be anionic or cationic. An anionic bond includes oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines.

Similarly, a chelating agent can be incorporated into the polymer as a collector site for attracting a mineral, such as copper. As shown in FIG. 6b, a mineral particle 72 is attached to the functional group 78 on the molecule 76. In general, the mineral particle 72 is much smaller than the synthetic bead 70. Many mineral particles 72 can be attracted to or attached to the surface 74 of a synthetic bead 70. When the mineral particles 72 are very fine, smaller synthetic beads 70 can also be used.

In some embodiments of the present invention, a synthetic bead may take the form of a solid-phase body made of a synthetic material, such as polymer. (By way of example, the term "solid-phase body" is understood herein to be a body having a cohesive force of matter that is strong enough to keep the molecules or atoms in the given positions, restraining the thermal mobility.) The polymer can be rigid or elastomeric. An elastomeric polymer can be a bisoxazolone-based polymer, for example. The body has a surface comprising a plurality of molecules with one or more functional groups for attracting mineral particles of interest to the surface. A polymer having a functional group to attract or collect mineral particles is referred to as a functionalized polymer. By way of example, the entire body of the synthetic bead may be made of the same functionalized material, or the bead body may be a shell, which can be formed by way of expansion, such as thermal expansion or pressure reduction.

The shell may be formed as a micro-bubble or a balloon. The shell, which may be made of functionalized material, may have an interior part. The interior part may be filled with air or gas to aid buoyancy, for example. The interior part can be used to contain a liquid to be released during the mineral separation process, in order to control the chemistry of the process being performed, e.g., in the flotation cell or column. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell can be used to encapsulate a powder which can have a magnetic property so as to cause the synthetic bead to be magnetic, for example. In such embodiments, an electromagnetic field may be generated to capture or stir the synthetic beads. The encapsulated liquid or powder may contain monomers, oligomers or short polymer segments for wetting the surface of mineral particles when released from the beads. For example, each of the monomers or oligomers may contain one functional group for attaching to a mineral particle of interest and one ionic bond for attaching the wetted mineral particle to the synthetic bead. The shell can be used to encapsulate a solid core, such as Styrofoam to aid buoyancy, for example. In yet another embodiment, only the coating of the bead body may be made of functionalized polymer. The synthetic bead can have a core made of ceramic, glass or metal and only the surface of core can have a coating made of functionalized polymer. The core can be a hollow core or a filled core depending on the applications. The core can be a micro-bubble, a sphere or balloon. For example, a filled core made of metal makes the density of the synthetic bead to be higher than the density of the pulp slurry, for example, so as to settle in the flotation cell or column and be capture. The core can be made of a magnetic material so that the para-, ferri-, ferro-magnetism of the synthetic bead is greater than the para-, ferri-, ferro-magnetism of the unwanted ground ore particle in the mixture. According to some embodiments, the synthetic bead can be configured with a ferro-magnetic or ferri-magnetic core that attract to paramagnetic surfaces. A core made of glass or ceramic can be used to make the density of the synthetic bead substantially equal to the density of the pulp slurry so that when the synthetic beads are mixed into the pulp slurry for mineral collection, the beads can be in a so-called suspension state.

It should be understood that the use of the term "bead" is not intended to limit the shape of the synthetic bead of the present invention to being spherical, as shown in FIGS. 6a, 6b. In various embodiments of the present invention, the synthetic bead can have an elliptical shape, a cylindrical shape, a shape of a block, an irregular shape. In effect, the scope of the invention is not intended to be limited to any particular type or kind of shape of the synthetic bead.

It should also be understood that the surface of a synthetic bead, according to the present invention, is not limited to an overall smoothness of its surface as shown in FIG. 6a. In some embodiments of the present invention, the surface can be irregular and rough. For example, the surface can have some physical structures like grooves or rods, or holes or dents. The surface can have some physical structures formed from stacked beads. The surface can have some hair-like physical structures. In addition to the functional groups on the synthetic beads that attract mineral particles of interest to the bead surface, the physical structures can help trapping the mineral particles on the bead surface. The surface can be configured to be a honeycomb surface or a sponge-like surface for trapping the mineral particles and/or increasing the contacting surface. In effect, the scope of the invention is not intended to be limited to any particular type or kind of surface of the synthetic bead.

It should be noted that the synthetic beads of the present invention can be realized by a different way to achieve the same goal. Namely, it is possible to use a different means to attract the mineral particles of interest to the surface of the synthetic beads. For example, the surface of the polymer beads or shells can be functionalized with a hydrophobic chemical molecule or compound, as discussed below. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. According to some embodiment, it may also be possible to release the mineral particles carried with the enriched synthetic beads by sonic agitation, such as ultrasonic waves, or simply by washing it with water.

Figure 7C:
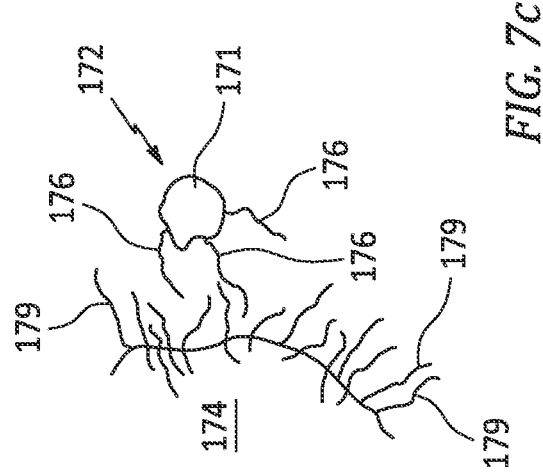
FIG. 7c illustrates an enlarged portion of the synthetic bead showing a hydrophobic particle attached to the hydrophobic surface of the synthetic bead, according to some embodiments of the present invention.
Figure 7A:
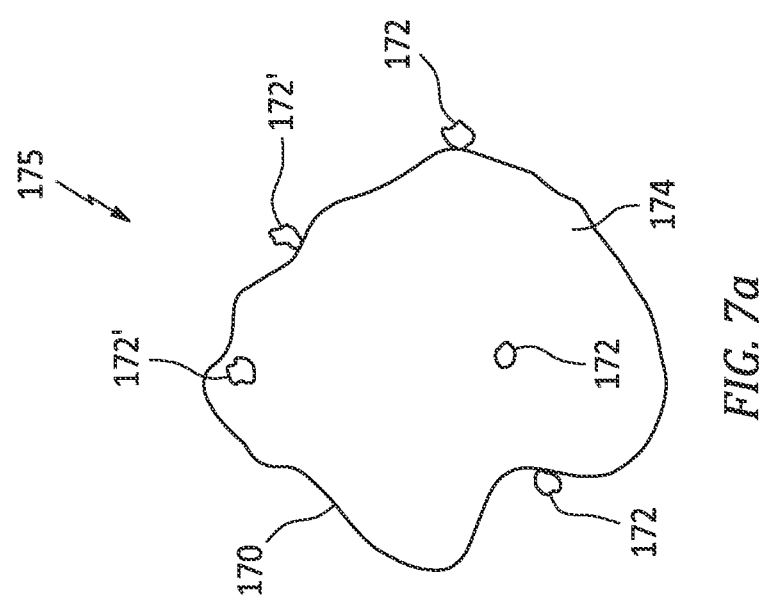
FIG. 7a shows a generalized synthetic bubble or bead having some particles attached to the surface, according to some embodiments of the present invention.

FIGS. 7a to 7c: Hydrophobicity

For aiding a person of ordinary skill in the art in understanding various embodiments of the present invention, FIG. 7a shows a generalized synthetic bubble or bead having some particles attached to the surface. FIG. 7b illustrates an enlarged portion of the synthetic bead showing a wetted mineral particle attached to the hydrophobic surface of the synthetic bead. FIG. 7c illustrates an enlarged portion of the synthetic bead showing a hydrophobic particle attached to the hydrophobic surface of the synthetic bead.

The hydrophobic particle can be mineral related or non-mineral related. The synthetic bead can be a size-based bead or bubble, weight-based polymer bead and bubble, or magnetic-based bead and bubble, consistent with that set forth herein. The size of the synthetic bead can be smaller than the minimum size of the mineral particles of interest which is about 150 μm, and can be larger than the maximum size of the mineral particles of interest. In certain applications, the size of the synthetic bead can be 1 cm or larger.

As shown in FIG. 7a, the synthetic bubble or bead 170 may have a bead body to provide a bead surface 174. At least the outside part of the bead body is made of a synthetic material, such as a hydrophobic polymer, or a coating of a hydrophobic chemical. As such, hydrophobic particles 172, 172' are attracted to the surface 174 to form an enriched synthetic bubble or bead 175. As shown in FIGS. 7a and 7b, the surface 174 of the synthetic bubble or bead comprises a plurality of molecules 179 which renders the surface 174 hydrophobic. For example, the surface 174 may be a glass surface coated with polysiloxanates which have functional groups that bind to the hydroxyl group of the glass surface. Polysiloxanates, such as hydroxyl-terminated polydimethysiloxanes, have a silicon-oxygen chain to provide the hydrophobic molecules 179. The hydrophobic particle 172', as shown in FIG. 5b, can be a mineral particle 171' having one or more collectors 173 attached thereto. One end (178) of the collector 173 has an ionic bond attached to the mineral particle of interest 171'. The other end of the collector 173 has a hydrophobic chain 176 which tends to move into the hydrophobic molecules 179. Thus, the hydrophobic particle 172' can be a wetted mineral particle. A collector, such as xanthate, has both the functional group 178 and the molecule 176. A xanthate, for example, has both the functional group 178 and the molecular segment 176 to be incorporated into the polymer that is used to make the synthetic bead 170. A functional group 178 is also known as a collector that can have a non-ionizing or ionizing bond. The ionizing bond can be anionic or cationic. An anionic bond includes oxyhydryl, such as carboxylic, sulfates and sulfonates, and sulfhydral, such as xanthates and dithiophosphates. Other molecules or compounds that can be used to provide the function group 178 include thionocarboamates, thioureas, xanthogens, monothiophosphates, hydroquinones and polyamines.

The hydrophobic particle 172, as shown in FIG. 7c, can be a particle that has a hydrophobic chain 176. Such particle can be non-mineral related, but it can be arranged to contact with the hydrophobic synthetic bubbles or beads 170 of the present inventions. Thus the hydrophobic bubbles or beads 170, according to various embodiments of the present invention, can be used in non-mining applications, such as water-pollution control and water purification.

pH

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Bead Size (Range)

The synthetic beads, according to some embodiments of the present invention, can be made with different sizes in order to attract mineral particles of different sizes. For example, unlike air bubbles, the synthetic beads of a larger size can be used to attract mineral particles larger than, say, 200 µm. Thus, the grinding of the blasted ore can be separated into different stages. In the first stage, the rock is crushed into particles in the order of 200 µm. After the separation process using the larger synthetic beads in the slurry containing these crude particles, the remaining slurry can be subjected to a finer grinding stage where the crushed rock is further crushed into particles in the order of 100 µm. With the slurry containing the finer mineral particles, synthetic beads with a smaller size may be more effective in interacting with the finer mineral particles. In a flotation cell application, the bead size can be smaller than 100 µm. In a tailings pond application, the bead size can be 1 mm to 10 mm or larger. However, large beads would reduce the functionalized surfaces where the mineral particles can attach to the synthetic beads. Thus, according to some embodiments of the present invention, the synthetic beads are configured with a size less than 100 µm for attracting to mineral particles having a substantially similar size, including in applications related to flotation cells; the synthetic beads are configured with a size of about 100 µm for attracting or attaching to mineral particles having a substantially similar size, smaller size or larger size; the synthetic beads are configured with a size in a range of about 50-500 µm for attracting or attaching to mineral particles having a substantially similar size, smaller size or larger size; the synthetic beads are configured with a size about 200 µm for attracting to mineral particles having a substantially similar size; the synthetic beads are configured with a size in a range of about 1 mm to 10 mm, including in applications related to a tailings pond. In general, the synthetic beads are configured with a size in a range of about 50 µm to 10 mm. But the beads can be smaller than 50 µm and larger than 10 mm.

Relative Size

According to some embodiments of the present invention, the synthetic beads are configured to be larger than the mineral particles. As such, a plurality of mineral particles may attach to one synthetic bead. According to other embodiments of the present invention, the synthetic beads are configured to be smaller than the mineral particles. As such, a plurality of synthetic beads may attach to one mineral particle. The size of the synthetic beads can also be about the same as the size of the mineral particle.

Oilsands Separation

It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

Portion of Surface Functionalized

According to some embodiments of the present invention, only a portion of the surface of the synthetic bead is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of
1. Once a mineral is attached, the weight of the mineral is likely to force the bead to rotate, allowing the bead to be located under the bead as it rises through the flotation cell;
   a. Better cleaning as it may let the gangue to pass through b. Protects the attached mineral particle or particles from being knocked off, and
c. Provides clearer rise to the top collection zone in the flotation cell.

Both Collector and Hydrophobic on Same Bead

Figure 8A:
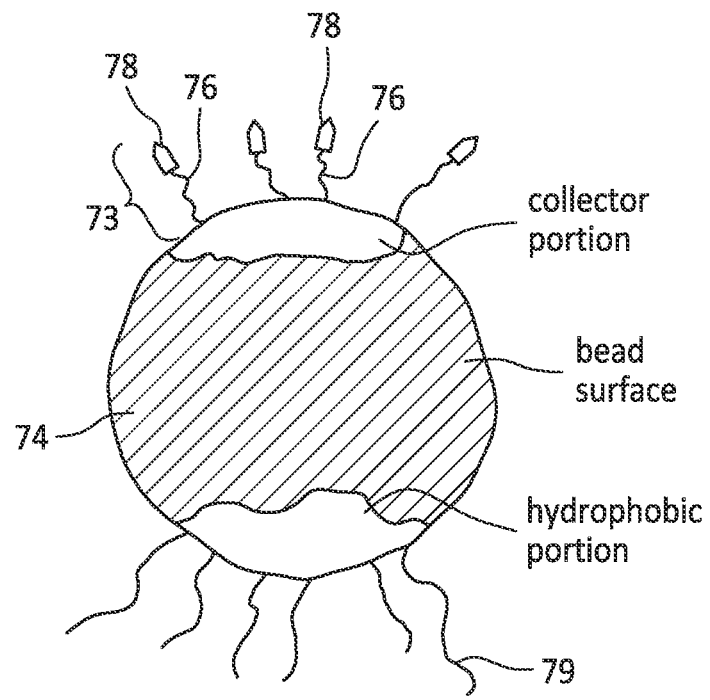
FIGS. 8a and 8b illustrate some embodiments of the present invention wherein the synthetic bead or bubble have one portion functionalized to have collector molecules and another portion functionalized to be hydrophobic, according to some embodiments of the present invention.
Figure 8B:
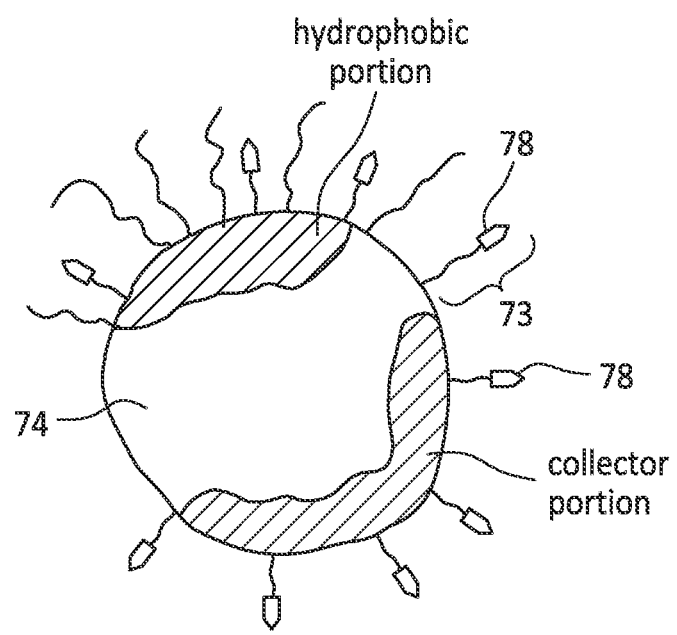

According to some embodiments of the present invention, one part of the synthetic bead is functionalized with collectors while another part of same synthetic bead is functionalized to be hydrophobic as shown in FIGS. 8a and 8b. As shown in FIG. 8a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179 (or 79). In the embodiment as shown in FIG. 8b, the entire surface of the synthetic bead 74 can be functionalized to have collector molecules 73, but a portion of the surface is functionalized to have hydrophobic molecules 179 (or 79) render it hydrophobic.

Advantages of Same Bead Having Both Collector Molecules and Hydrophobic Molecules According to some embodiments of the present invention, one part of the synthetic bead is functionalized with collectors while another part of same synthetic bead is functionalized to be hydrophobic and this "hybrid" synthetic bead is configured for use in a traditional flotation cell as well. The "hybrid" synthetic bead (see FIGS. 6a and 6b) has a hydrophobic portion and a separate collector portion. When the "hybrid" beads are mixed with air in the flotation cell, some of them will attach to the air bubbles because of the hydrophobic portion. As the "hybrid" synthetic bead is attached to an air bubble, the collector portion of the attached bead can collect mineral particles with the functional groups. Thus, the synthetic beads, according to some embodiments of the present inventions, can be used to replace the air bubbles, or to work together with the air bubbles in a flotation process.

This "hybrid" synthetic bead can collect mineral particles that are wet and not wet.

A Collector

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

Applications

The scope of the invention is described in relation to mineral separation, including the separation of copper from ore.

By way of example, applications are envisioned to include:

Rougher/scavenger separation cells in the production stream, replacing the traditional flotation machines.

Tailings scavenger cells used to scavenge the unrecovered minerals from a tailings stream.

Tailings cleaning cell use to clean unwanted material from the tailings stream before it is sent to the disposal pond.

Tailings reclamation machine that is placed in the tailings pond to recover valuable mineral that has been sent to the tailings pond.

Other types or kinds of valuable material or minerals of interest, including gold, molybdenum, etc.

However, the scope of the invention is intended to include other types or kinds of applications either now known or later developed in the future, including applications related to oilsands separation that includes separating bitumen from sand and water in the recovery of bitumen in an oilsands mining operation.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. Apparatus for use in, or forming part of, a separation process to be implemented in separation processor technology, the apparatus comprising:
synthetic beads, each synthetic bead having body made of a synthetic material, the synthetic material comprising a polymer or polymer-based material, the body having a surface configured with a hydrophobic silicone polymer different from said synthetic material, said synthetic beads functionalized to attach to a valuable material in a mixture having water so as to form an enriched synthetic beads having the valuable material attached thereto, and also configured to be separated from the mixture based at least partly on a difference in a physical property between the enriched synthetic beads having the valuable material attached thereto and the mixture, wherein the valuable material comprises mineral particles.

2. Apparatus according to claim 1, wherein the synthetic beads are configured to be separated from the mixture based at least partly on the difference between the size of the enriched synthetic beads having the valuable material attached thereto in relation to the size of unwanted material in the mixture.

3. Apparatus according to claim 1, wherein the synthetic beads are configured to be separated from the mixture based at least partly on the difference between the weight of the enriched synthetic beads having the valuable material attached thereto in relation to the weight of unwanted material in the mixture.

4. Apparatus according to claim 1, wherein the synthetic beads are configured to be separated from the mixture based at least partly on the difference between the para-, ferri-, ferro-magnetism of the enriched synthetic beads having the valuable material attached thereto in relation to the para-, ferri, ferro-magnetism of unwanted material in the mixture.

5. Apparatus according to claim 1, wherein the synthetic beads are configured to be separated from the mixture based at least partly on the difference between the density of the enriched synthetic beads having the valuable material attached thereto and the density of the mixture.

6. Apparatus according to claim 2, wherein the synthetic beads are configured so that the size of the synthetic beads is greater than a maximum ground ore particle size in the mixture.

7. Apparatus according to claim 2, wherein the synthetic beads are configured so that the size of the synthetic beads is less than a minimum ground ore particle size in the mixture.

8. Apparatus according to claim 2, wherein the synthetic beads are configured as solid polymer beads.

9. Apparatus according to claim 2, wherein the synthetic beads are configured with a core material of sand, silica or other suitable material and also configured with a polymer encapsulation.

10. Apparatus according to claim 2, wherein the apparatus further comprises a vertical column or horizontal pipeline for implementing the separation process, the vertical column or horizontal pipeline being configured with a screen to separate the enriched synthetic beads having the valuable material attached thereto from the mixture based at least partly on the difference in size.

11. Apparatus according to claim 10, wherein the vertical column or horizontal pipeline is also configured to separate the enriched synthetic beads having the valuable material attached thereto from the mixture using countercurrent flows with mixing, so as to
  receive in the vertical column or horizontal pipeline ground ore flowing in a first direction,
  receive in the vertical column or horizontal pipeline slurried synthetic beads flowing in a second direction opposite to the first direction,
  provide from the vertical column or horizontal pipeline the enriched synthetic beads having the valuable material attached thereto and flowing in the second direction, and
  provide from the vertical column or horizontal pipeline waste that is separated from the mixture using the screen and flowing in the second direction.

12. Apparatus according to claim 10, wherein the vertical column or horizontal pipeline is also configured to separate the enriched synthetic beads having the valuable material attached thereto from the mixture using concurrent flows with mixing, so as to
  receive in the vertical column or horizontal pipeline the synthetic beads in water flowing in a first direction,
  receive in the vertical column or horizontal pipeline ground ore flowing in the first direction,
  provide from the vertical column or horizontal pipeline waste that is separated from the mixture using the screen and flowing in the first direction, and
  provide from the vertical column or horizontal pipeline the enriched synthetic beads having the valuable material attached thereto and flowing in the first direction.

13. Apparatus according to claim 2, wherein the apparatus further comprises a vertical column or horizontal pipeline for implementing the separation process, the vertical column or horizontal pipeline being configured to
  receive the synthetic beads in water,
  receive ground ore, and
  provide the synthetic beads in water and the ground ore in a process mixture; and
  a hydrocyclone cyclone configured to
  receive the process mixture,
  separate from the process mixture the enriched synthetic beads having the valuable material attached thereto and unwanted material in the form of waste ore, and
  provide either the enriched synthetic beads having the valuable material attached thereto or the waste ore, including separating the waste ore in the form of ore particles that are smaller in size than the enriched synthetic beads having the valuable material attached thereto, and including separating the enriched synthetic beads having the valuable material attached thereto that are larger in size than the ore particles.

14. Apparatus according to claim 2, wherein the apparatus further comprises a mixing vat, a screen and a hydrocyclone cyclone for implementing the separation process,
  the mixing vat being configured to receive the synthetic beads and ore particles in a slurry, and to provide the enriched synthetic beads having the valuable material attached thereto and waste; and
  the screen being configured to separate the enriched synthetic beads having the valuable material attached thereto and the waste; or
  the hydrocyclone cyclone being configured to separate the enriched synthetic beads having the valuable material attached thereto and the waste.

15. Apparatus according to claim 3, wherein the synthetic beads are configured so that the weight of the synthetic beads is greater than a maximum ground ore particle weight in the mixture.

16. Apparatus according to claim 3, wherein the synthetic beads are configured so that the weight of the synthetic beads is less than a minimum ground ore particle weight in the mixture.

17. Apparatus according to claim 3, wherein the synthetic beads are configured as solid polymer beads.

18. Apparatus according to claim 3, wherein the synthetic beads are configured with a core material of magnetite, air or other suitable material and also configured with a polymer encapsulation.

19. Apparatus according to claim 3, wherein the apparatus further comprises a vertical column or horizontal pipeline for implementing the separation process, the vertical column or horizontal pipeline configured to
  receive the synthetic beads in water,
  receive ground ore,
  provide the synthetic beads in water and the ground ore in a process mixture; and
  a hydrocyclone cyclone configured to
  receive the process mixture,
  separate from the process mixture the enriched synthetic beads having the valuable material attached thereto and unwanted material in the form of waste ore; and
  provide either the enriched synthetic beads having the valuable material attached thereto or the waste ore, including where the enriched synthetic beads having the valuable material attached thereto take the form of the enriched synthetic beads that are heavier than ore particles, and including where the waste ore takes the form of ore particles that are lighter than the enriched synthetic beads having the valuable material attached thereto.

20. Apparatus according to claim 3, wherein the apparatus further comprises a wet or dry mixing vat, a screen and a hydrocyclone cyclone for implementing the separation process, the wet or dry mixing vat being configured to receive the synthetic beads and ore particles in a slurry, and to provide the enriched synthetic beads having the valuable material attached thereto and waste ore; and the screen being configured to separate the enriched synthetic beads having the valuable material attached thereto and the waste ore, including being responsive to a jig for weight-based separation; or the hydrocyclone cyclone being configured to separate the enriched synthetic beads having the valuable material attached thereto and the waste ore.

21. Apparatus according to claim 4, wherein the synthetic beads are configured so that the para-, ferri-, ferro-magnetism of the synthetic beads is greater than the para-, ferri-, ferro-magnetism of unwanted ground ore particle in the mixture.

22. Apparatus according to claim 4, wherein the synthetic beads are configured with a ferro-magnetic or ferri-magnetic core that attract to para-magnetic surfaces and also configured with a polymer encapsulation.

23. Apparatus according to claim 4, wherein the synthetic beads are configured with a para-magnetic core that attract to magnetized surfaces and also configured with a polymer encapsulation.

24. Apparatus according to claim 4, wherein the apparatus further comprises a column or pipeline and a drum or belt separator for implementing the separation process, the column or pipeline being configured to
receive the synthetic beads,
receive a ground ore slurry, and
provide the synthetic beads and the ground ore slurry in a process mixture; and
the drum or belt separator being configured to
receive the process mixture,
separate the enriched synthetic beads having the valuable material attached thereto and the unwanted material in the form of waste ore, and
provide the enriched synthetic beads having the valuable material attached thereto and the waste ore.

25. Apparatus according to claim 24, wherein the drum or belt separator is configured to be magnetized or have magnetic fields extending to or along a portion of a surface of the drum or belt separator so as to form a separator surface to collect paramagnetic, ferro-magnetic or ferry-magnetic synthetic beads attracted to the separator surface.

26. Apparatus according to claim 1, wherein the polymer or polymer-based material is polyurethanes.

27. Apparatus according to claim 1, wherein one part of the surface comprise collectors.

28. Apparatus according to claim 27, wherein another part of the surface comprises the hydrophobic silicone polymer.

29. Apparatus according to claim 1, wherein the hydrophobic silicone polymer is polysiloxanates.

* * * * *